No. 892,948. PATENTED JULY 7, 1908.
R. H. FAUGHNDER.
SHIELD FOR TIRES.
APPLICATION FILED MAR. 2, 1908.
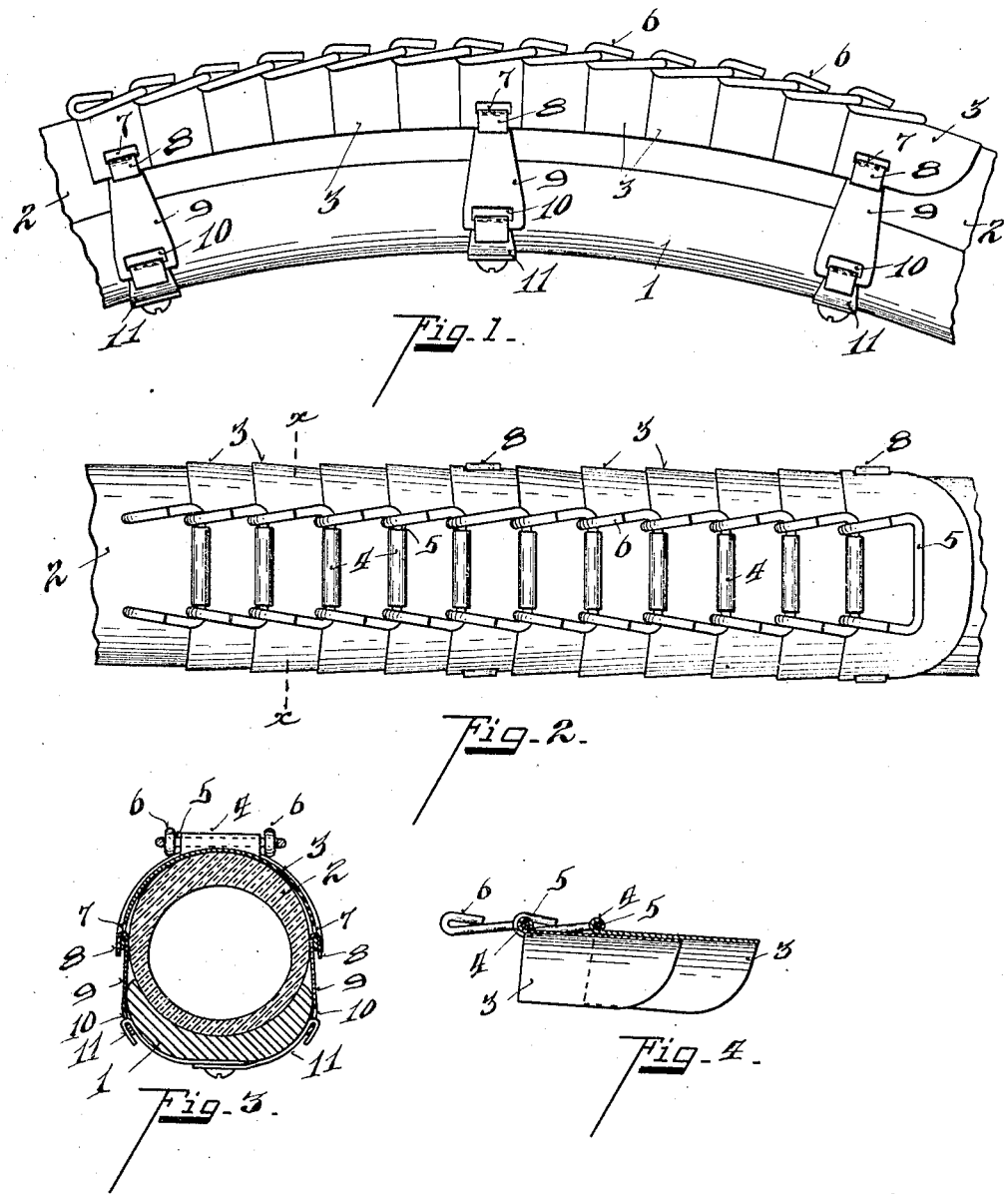

UNITED STATES PATENT OFFICE.

RICHARD H. FAUGHNDER, OF SIDNEY, OHIO, ASSIGNOR OF ONE-FOURTH TO CHARLES PEARSON AND ONE-FOURTH TO GEORGE BUSTETTER, OF SIDNEY, OHIO.

SHIELD FOR TIRES.

No. 892,948.

Specification of Letters Patent.

Patented July 7, 1908.

Application filed March 2, 1908. Serial No. 418,904.

*To all whom it may concern:*

Be it known that I, RICHARD H. FAUGHNDER, a citizen of the United States, residing at Sidney, in the county of Shelby and State of Ohio, have invented certain new and useful Improvements in Shields for Tires, of which the following is a specification.

My invention relates to an improvement in means for protecting the wearing surface of a tire at the same time providing means for preventing slipping or skidding.

The object of my invention is to provide a series of plates overlapping each other and extending around the periphery of the tire, held in position at one end by a hinge connection with the links of a chain, the opposite end of a given plate lying underneath the next adjacent plate or plates, the plates being of such shape and size as to yield with the tire.

Another object of my invention relates to the peculiar means employed for maintaining the tire cover in position, without interfering with its yielding action.

The features of my invention will be more fully set forth in the description of the accompanying drawings, forming a part of this specification, in which:—

Figure 1 is a side elevation of a portion of the tire with my improved anti-skidding nonpuncturable cover applied. Fig. 2 is a top plan view of the same. Fig. 3 is a section on line x, x, Fig. 2. Fig. 4 is a section through two of the plates and chain.

1 represents the rim.

2 represents the tire, which may be of any well-known construction.

3 represents a series of plates provided at one end with an eye 4, through which cross bars 5 of the links of the chain pass. The free ends of the chains are provided with the hooks 6 adapted to connect with the cross bar 5 of an adjacent link. The plates 3 are similarly connected to the links of the chain throughout the series. The end of each plate opposite the eye is curved and underlies the adjacent plate of the series. The plates 3 at intervals are provided with the slots 7, through which the hook ends 8 of the tie plates 9 engage. The plates 9 are provided with a slot 10 through which the hook ends of the anchoring plates 11 project, the said anchoring plates 11 being secured to the rim 1, thereby securely maintaining the cover in position upon the tire. The hooks have a free engagement with their respective slots enabling the plates 3 to move inward toward the center of the hub of the wheel without becoming detached thereby yielding with the tire, the plates performing the function, as they are constructed of metal, of preventing the tire from becoming punctured and the chain preventing skidding.

By the construction shown the cover and chain are readily removable by disengaging the plates 10 from the hook members or plates 11, and one of the links of the chain.

Having described my invention, I claim:—

1. A tire cover comprising a series of metallic plates overlapping each other at one end, a chain encircling the outer surface of said plates, said plates being pivotally connected to the links of the chain, and means for securing the plates to the rim, substantially as described.

2. A cover for a tire comprising a series of links connected together, a series of plates overlapping each other at one end, the opposite end of each plate being pivotally connected to one of the cross bars of the links, and straps loosely connected to the plates at suitable intervals at one end, the opposite ends of said straps being connected to the rim of the tire, substantially as described.

In testimony whereof, I have hereunto set my hand.

RICHARD H. FAUGHNDER.

Witnesses:
HUGH DOORLEY,
G. P. HANNAFORD.